Figure 1:
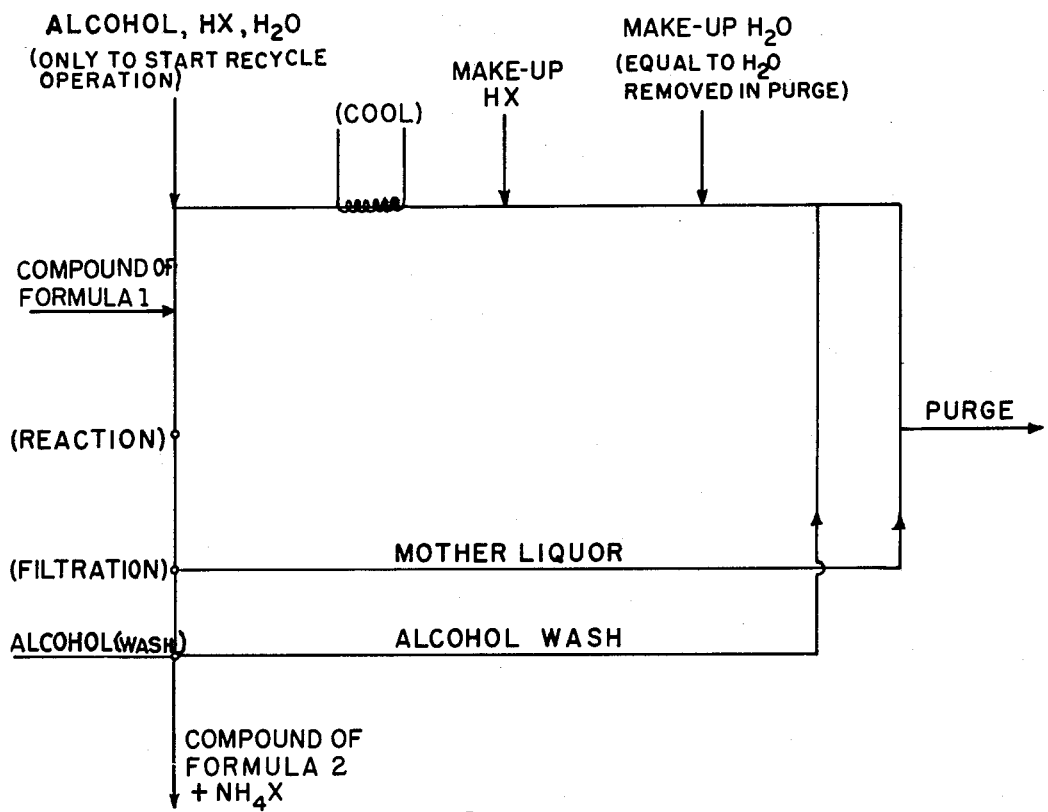

July 3, 1956     E. W. CUMMINS     2,753,376

PREPARATION OF AMINOACETOPHENONES

Filed Nov. 17, 1954

INVENTOR

EARL W. CUMMINS

BY

ATTORNEY 2,753,376
Patented July 3, 1956

2,753,376

PREPARATION OF AMINOACETOPHENONES

Earl W. Cummins, Wilmington, Del., assignor to E. I. du Pont de Nemours and Company, Wilmington, Del., a corporation of Delaware Application November 17, 1954, Serial No. 469,411

3 Claims. (Cl. 260—570.5)

This invention relates to an improved process for preparing hydrohalo salts of substituted alpha-aminoacetophenones. More particularly the invention is directed to the hydrolysis of hexamethylenetetramminium salts of alpha-haloacetophenones using anhydrous hydrogen halides in an alcoholic medium.

The process of my invention comprises mixing a compound of the formula

1. 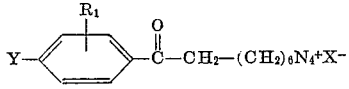

where Y is a member of the group consisting of alkylsulfonyl, halogenoalkylsulfonyl containing 1 to 2 carbon atoms, fluorosulfonyl, sulfamyl, monoalkylsulfamyl, dialkylsulfamyl, and hydroxyethylsulfamyl;

$R_1$ is a member of the group consisting of hydrogen, lower alkyl and lower alkoxy groups; and X is a halogen of the group consisting of chlorine and bromine; with an anhydrous hydrogen halide of the group consisting of hydrogen chloride and hydrogen bromide in the presence of a monohydric aliphatic alcohol having from 1 to 6 carbon atoms and at least catalytic amounts of water but not exceeding about 1.5 moles of water per mole of hydrogen halide.

The hexamethylenetetramminium salts of alpha-haloacetophenones represented by Formula 1 are known compounds.

Compounds of Formula 1 wherein X is sulfamyl, alkylsulfamyl and dialkylsulfamyl are fully described in U. S. 2,680,135. The alkylsulfonyl and halogenoalkylsulfonyl derivatives of Formula 1 are described in the copending applications of Walter A. Gregory, Serial Nos. 257,986, now abandoned and 418,227 respectively, and are claimed in the copending application of Walter A. Gregory, Serial No. 337,236. The fluorosulfonyl compounds of Formula 1, that is, where Y is fluorosulfonyl, are fully described and claimed in United States Patent 2,680,134.

The reaction between a compound of Formula 1 and anhydrous hydrogen halide can be illustrated by the following equation:

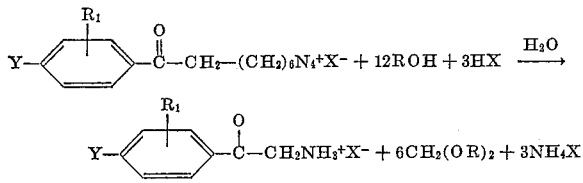

Y, $R_1$ and X have the same significance as in Formula 1 and R is a lower alkyl group. By lower alkyl is meant an alkyl group having from 1 to 6 carbon atoms.

It can be seen from the above equation that the hydrohalo salts of alpha-aminoacetophenones produced by the process of my invention have the formula 2. 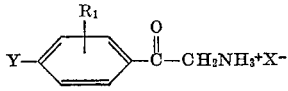

where Y, $R_1$ and X have the same significance as in Formula 1.

I have found surprisingly that by effecting the hydrolysis of compounds of Formula 1 with anhydrous hydrogen chloride or bromide instead of with concentrated aqueous acid as taught by the prior art substantial improvements in yields of compounds of Formula 2 are realized. Yield increases of the order of 20 percent can be obtained in batch operation, and even greater yield increases can be obtained by the use of a recycle operation.

A skeleton flow diagram of my recycle operation is shown in Figure 1. Such a recycle process is impractical when concentrated aqueous acid is employed. More will be said later about the recycle operation which is a preferred embodiment of the present invention.

In carrying out the process of the invention, an alcoholic solution of the gaseous anhydrous acid is generally first prepared. The hexamethylenetetramminium salt of Formula 1 is then added in one portion to the alcoholic solution. The resulting alcohol slurry is stirred until the reaction is substantially complete. The slurry is cooled and filtered. The filtrate is set aside and the residue is washed with cold alcohol and dried to give a mixture of the desired substituted aminoacetophenone and ammonium halide. The substituted alpha-aminoacetophenone hydrohalo salt is separated from ammonium halide impurities and further purified by conventional chemical methods.

In a recycle operation, as shown in Figure 1, a purge is removed from the above filtrate. The remaining filtrate and washings are recycled back to the start of the reaction. Make-up acid and water are added and the above described reaction is repeated. Such a recycle process in contrast to a batch process reduces the loss of materials due to solubility in mother liquor.

The alcohol in which the hydrolytic process of this invention is effected is a monohydric aliphatic alcohol having not more than 6 carbon atoms. Of this class of alcohols ethanol is preferred.

The quantity of alcohol employed may vary over a wide range and is limited only by the viscosity of the alcoholic slurry. Preferably 4 to 8 parts by volume of alcohol are used for each part of compound Formula 1.

In practicing the process of the present invention, at least stoichiometric amounts of anhydrous acid are employed. A small excess, say, 10% of acid is preferred since the desired reaction is not obtained at high pH levels.

As already indicated, the total amount of water present in the reaction system can vary from about 1.5 moles of water per mole of hydrogen halide to traces or catalytic amounts of water.

The quantity of anhydrous hydrogen chloride or hydrogen bromide is important. Mainly for economic reasons, a lower limit of from 3.0 to 3.3 moles of hydrogen halide (this is about 1.1 times the theoretical amount) and an upper limit of about 6 moles per mole of a compound having Formula 1 is preferred. Use of less acid than 3.0 moles per mole of compound 1 results in an incomplete reaction, the final product being contaminated with partial hydrolysis products. More than 6 moles of anhydrous acid is economically wasteful and may cause process difficulties.

In the batchwise operation of the process of this invention, the starting material represented by Formula 1 can be dry or wet with one or more of the solvents used in its preparation; that is, chlorinated hydrocarbons such as for instance ethylene dichloride, methylene chloride, ethylidene dichloride or chlorobenzene. The presence of solvent is beneficial since it reduces the solubility of the amine salt of Formula 2 in the reaction medium.

In the recycle operation, however, the starting material should be substantially dry. Otherwise, there would be a build-up of reaction volume as the recycle operation proceeds.

The temperature at which reaction is effected may vary over a wide range. Preferably, the reaction is carried out at a temperature of from 30° to 60° C. Temperatures outside this preferred range may be used but some decomposition is generally noted when the reactants are heated over about 60° C.

The hydrolysis reaction is rapid and is completed in three hours or less. When the reaction is complete, the reaction mixture is filtered, and the solid material collected and washed with alcohol. The reaction mixture is preferably cooled prior to filtration since the solubility of the desired product in the reaction mixture is thereby diminished. The washed product is dried under mild conditions as there is a tendency for the product to decompose if the drying treatment is a vigorous one.

In the recycle operation which is preferred embodiment of the invention, it is essential to take a purge of the filtrate. This is necessary since the alcohol consumed in the formation of the by-product dialkyl formal must be replaced. The build-up of dialkyl formal in the recycle streams has no other effect on the operation except the beneficial one of reducing the solubility of compounds of Formula 2 in the filtrate.

The amount of purge taken is usually sufficient to maintain the volume of the recycle system approximately constant, or to cause it to change but slowly. Depending upon the volume of the filtrate (that is, the ratio of filtrate per unit amount of reagent) and hence depending upon the desired dilution of the reagents with alcohol, the purge is about 20–40% by volume of the filtrate. Make-up alcohol must be added to compensate for the loss of alcohol in the purge as well as in the dialkyl formal formed. This make-up alcohol can be most advantageously added in the form of a wash of the residue obtained by filtering the reaction mixture. The amount of purge and of make-up alcohol should be adjusted so that there are always at least 16 moles of alcohol per mole of a compound of Formula 1 in the reaction slurry.

For example, if the reagents and the conditions are chosen as in the following illustrative example, and if a 30% purge is taken, and if the make-up alcohol is equal in volume to the volume of the purge, then after 10 recycles this procedure would result in a reaction volume increase of about 40%, due to the diethyl formal formed.

The wash and unpurged filtrate are combined. Make-up water and make-up HX are then added. The addition of HX is exothermic; therefore, cooling should be employed during this operation. The resulting solution is then added to a compound of Formula 1 or vice versa and the reaction conducted within the operating conditions previously described.

EXAMPLE 1

To a solution consisting of 160 g. of absolute ethanol, containing 0.1% water, 13.5 ml. of distilled water, 0.8 gram benzene (equivalent to 169.4 grams of 95% commercial ethanol and 5.23 ml. of water) and 49.7 ml. of ethylene dichloride, there is added thru a purge tube dipping below the surface of the solution a total of 21.9 grams (0.60 mole: twice the theoretical amount) of gaseous hydrogen chloride (the ratio of water to hydrogen chloride is 1.26 mole/mole hydrochloride). The addition requires 20 minutes. The reaction is very exothermic and ice-cooling is necessary to maintain the temperature at 25° C.

A total of 41.73 grams (0.10 mole of N-[p-(methylsulfonylbenzoyl)methyl]hexamethylene tetrammonium bromide (99.3% pure) is added rapidly to the hydrogen chloride solution. No heat effect is observed. The resulting slurry is heated to 40° C. and there maintained for 3 hours. It is then cooled to 0° C. and there maintained for 30 minutes. At no time did complete solution occur but no stirring difficulties were encountered. The slurry is then filtered.

The wet cake is collected and found to weigh 74.4 grams. The cake is washed with ether (2×40 ml.) and air-dried. The dry product weighing 31.75 grams is found to contain 68.5% of alpha-amino-p-methylsulfonylacetophenone hydrochloride by ultra-violet analysis. This corresponds to an 88% yield based on the N-[p-(methylsulfonylbenzoyl)methyl]hexamethylene tetrammonium bromide content of the starting material. Ultra-violet analysis of the mother liquor showed that it contained an additional 9% of alpha-amino-p-methylsulfonylacetophenone hydrochloride.

EXAMPLE 2

Using a procedure similar to that of Example 1, 21.9 grams (0.60 mole: twice the theoretical amount) of gaseous hydrogen chloride is added thru a purge tube to a solution consisting of 119 grams of absolute ethanol containing 0.08% water, 16.2 ml. of distilled water, 0.6 gram of benzene (equivalent to 125.88 grams of 95% commercial ethanol and 10.015 grams water) and 25.5 ml. of ethylene dichloride. The ratio of water in the reaction system is 1.507 moles water/1 mole hydrogen chloride.

As in Example 1 N-[p-(methylsulfonylbenzoyl)methyl]hexamethylene tetramminium bromide is added to the resulting HCl solution to obtain alpha-amino-p-methylsulfonylacetophenone hydrochloride in 89% yield. Ultra-violet analysis of the mother liquor again revealed that it contained an additional 9% of alpha-amino-p-methylsulfonylacetophenone hydrochloride.

In both Examples 1 and 2 the product undoubtedly exists as a mixture of the hydrochloro and hydrobromo salts. The assumption has been made that only the hydrochloride salt is present to facilitate yield calculations and analyses. The ultra-violet absorption of the hydrochloro and hydrobromo salts is substantially equivalent.

The advantages of the present invention over the prior art are two-fold. First, substantially higher yields are obtained. Second, recycle operations are possible. The latter advantage becomes more and more important the greater the solubility of the amine salt of Formula 2. The advantages of the recycle operation are summarized in the following table:

*Table*

| Yield by Straight Batchwise Operation | Overall Yield After 10 Recycles-30% Purge [1] | Percent Improvement Obtained by 10th Recycle Operation |
| --- | --- | --- |
| 100 | 100 | 0 |
| 90 | 97 | 8 |
| 80 | 94 | 18 |
| 70 | 90 | 29 |
| 60 | 87 | 45 |
| 50 | 84 | 72 |
| 40 | 80 | 100 |
| 30 | 77 | 156 |
| 20 | 74 | 270 |
| 10 | 71 | 610 |

[1] Approximately 15% of the liquid portion of the final reaction mixture is retained on the filter cake. Therefore, the above figures are based on the removal of only 25% of the total amount of material soluble in the liquid portion of the reaction mixture.

I claim:

1. A process which comprises mixing a tetramminium salt of the formula

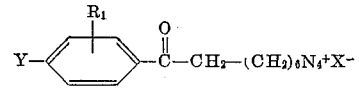

where Y is a member of the group consisting of alkylsulfonyl, halogenoalkylsulfonyl containing 1 to 2 carbon atoms, fluorosulfonyl, sulfamyl, monoalkylsulfamyl, dialkylsulfamyl and hydroxyethylsulfamyl; $R_1$ is a member of the group consisting of hydrogen, lower alkyl and lower alkoxy groups; and X is a halogen of the group consisting of chlorine and bromine; with an anhydrous hydrogen halide of the group consisting of hydrogen chloride and hydrogen bromide, said halide being present in an amount not exceeding 6 moles per mole of said salt, in the presence of a monohydric aliphatic alcohol having from 1 to 6 carbon atoms and at least catalytic amounts of water but not exceeding about 1.5 moles of water per mole of anhydrous hydrogen halide, whereupon a compound of the formula

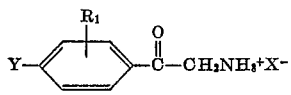

where Y, $R_1$ and X have the same significance as above is obtained.

2. A continuous process for preparing a compound of the formula

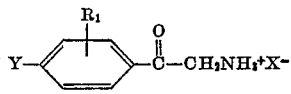

where Y is a member of the group consisting of alkylsulfonyl, halogenoalkylsulfonyl containing 1 to 2 carbon atoms, fluorosulfonyl, sulfamyl, monoalkylsulfamyl, dialkylsulfamyl, and hydroxyetheylsulfamyl; $R_1$ is a member of the group consisting of hydrogen, lower alkyl and lower alkoxy groups; and X is a halogen of the group consisting of chlorine and bromine; which comprises adding a salt of the formula

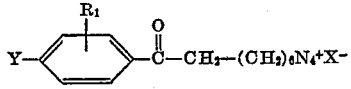

where Y, $R_1$ and X have the same significance as above, to an anhydrous hydrogen halide of the group consisting of hydrogen chloride and hydrogen bromide, said hydrogen halide being present in an amount not exceeding 6 moles per mole of said salt, in the presence of a monohydric aliphatic alcohol having from 1 to 6 carbon atoms and at least catalytic amounts of water but not exceeding about 1.5 moles of water per mole of hydrogen halide, stirring the resulting alcohol slurry until the reaction is substantially complete, cooling and then filtering the slurry, washing the residue with cold alcohol, removing a purge consisting of water, alcohol, dialkyl formal, ammonium halide, hydrogen halide, and hydrohalo salt of the desired substituted amino acetophenone from the filtrate, recycling the remaining filtrate and alcoholic washings to the start of the reaction, adding make-up acid and water, and removing from the system the desired hydrohalo salt.

3. A process for preparing α-amino-p-methylsulfonylacetophenone hydrochloride which comprises mixing N-[p - (methylsulfonylbenzoyl)methyl]hexamethylene tetrammonium bromide with anhydrous hydrogen chloride, said chloride being present in an amount not exceeding 6 moles per mole of said bromide, in the presence of ethanol and at least a catalytic amount of water but not exceeding 1.5 moles of water per mole of said chloride.

References Cited in the file of this patent

UNITED STATES PATENTS

| 2,516,098 | Bambas | July 25, 1950 |
| 2,546,762 | Long | Mar. 27, 1951 |
| 2,680,134 | Gregory | June 1, 1954 |
| 2,680,135 | Gregory | June 1, 1954 |

FOREIGN PATENTS

| 74,484 | Denmark | July 28, 1952 |
| 512,433 | Belgium | July 15, 1952 |

OTHER REFERENCES

Long et al.: JACS, vol. 71 (1949), pp. 2473–75.
Bost et al.: JACS, vol. 73 (1951), pp. 5864–65.
Cutler et al.: JACS, vol. 74 (1952), pp. 5475–81.
Suter et al.: JACS, vol. 75 (1953), pp. 4330–33.
Buu-Hoi et al.: J. Chem. Soc. (London), 1951, pp. 255–57.